Dec. 9, 1924.
S. O. HOLLAND
1,518,327
SEED MECHANISM FOR PLANTERS
Filed Dec. 8, 1922   3 Sheets-Sheet 1
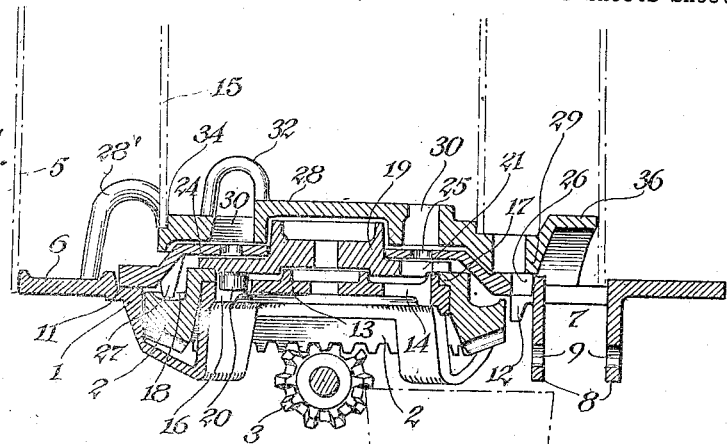
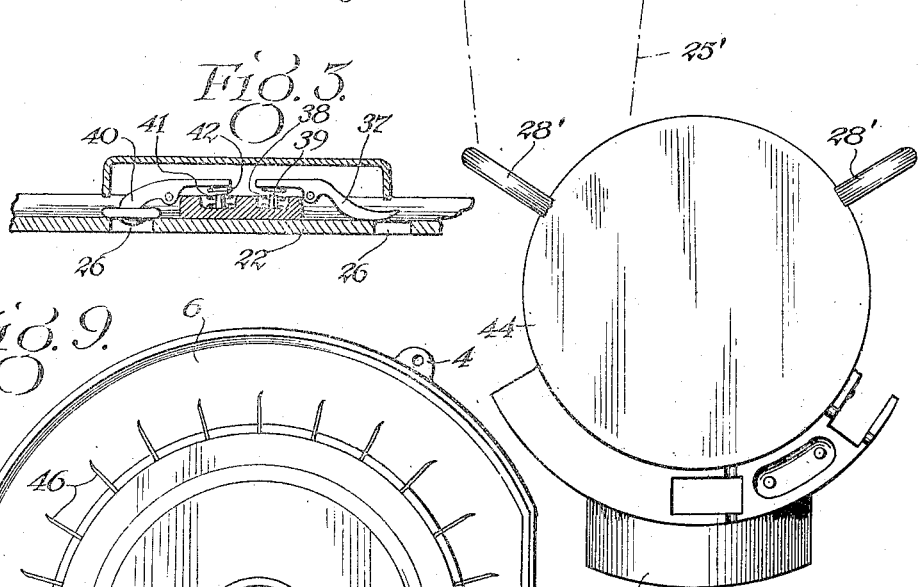
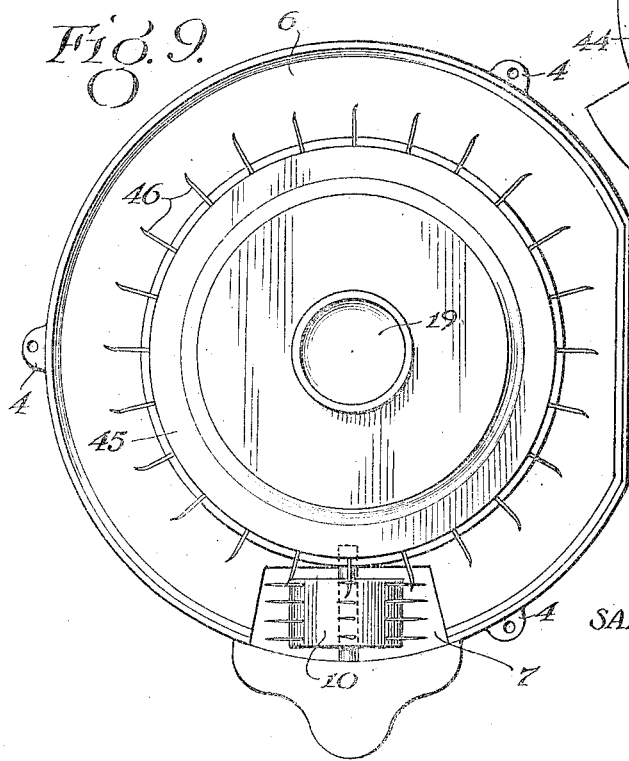
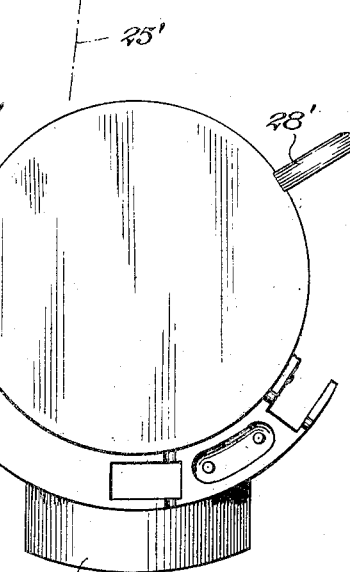
Inventor
SAMUEL OTHO HOLLAND.
Eccleston & Eccleston
Attorneys.

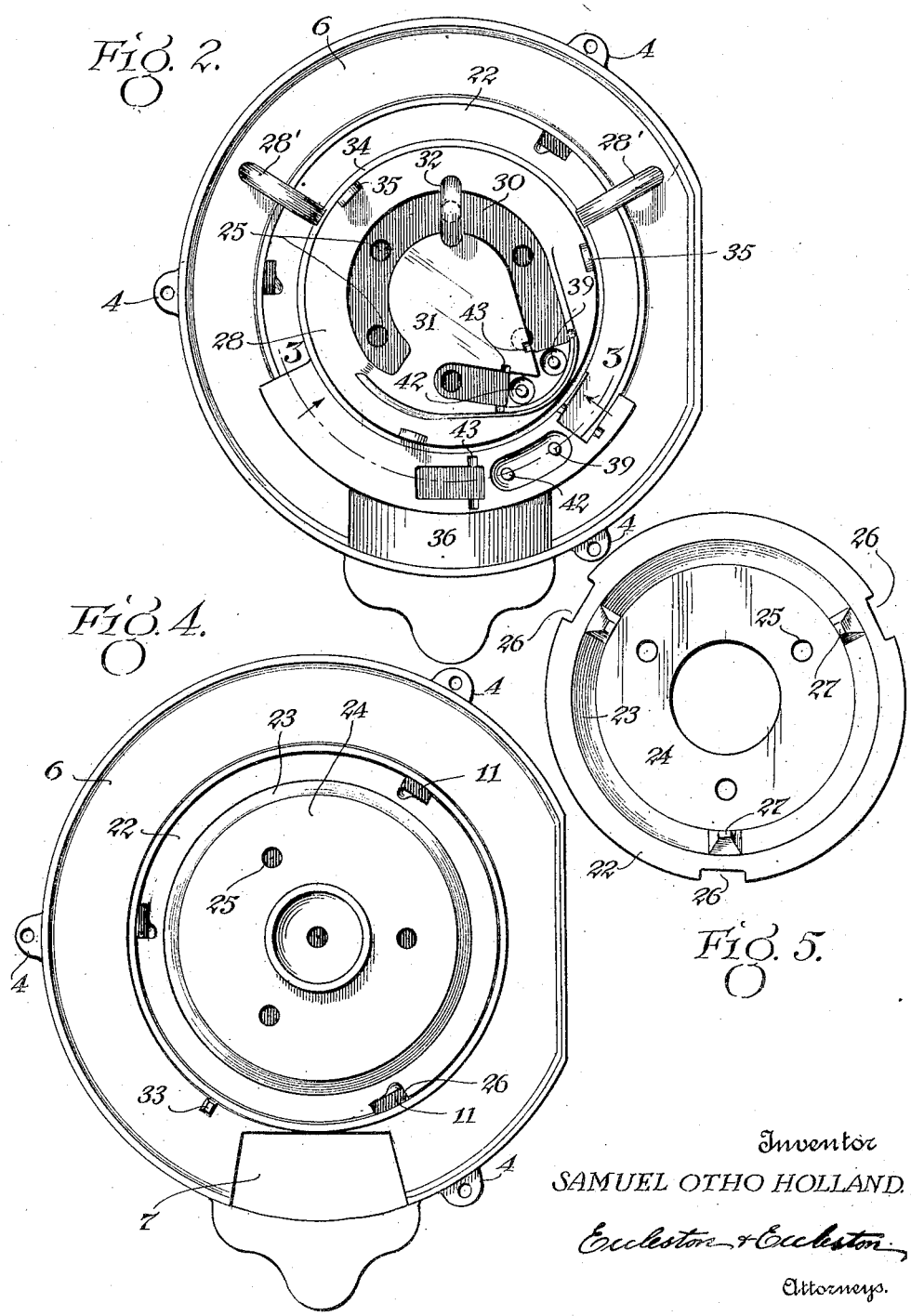

Dec. 9, 1924.　　　　　　　　　　　　　　　　　　1,518,327
S. O. HOLLAND
SEED MECHANISM FOR PLANTERS
Filed Dec. 8, 1922　　　　3 Sheets-Sheet 3
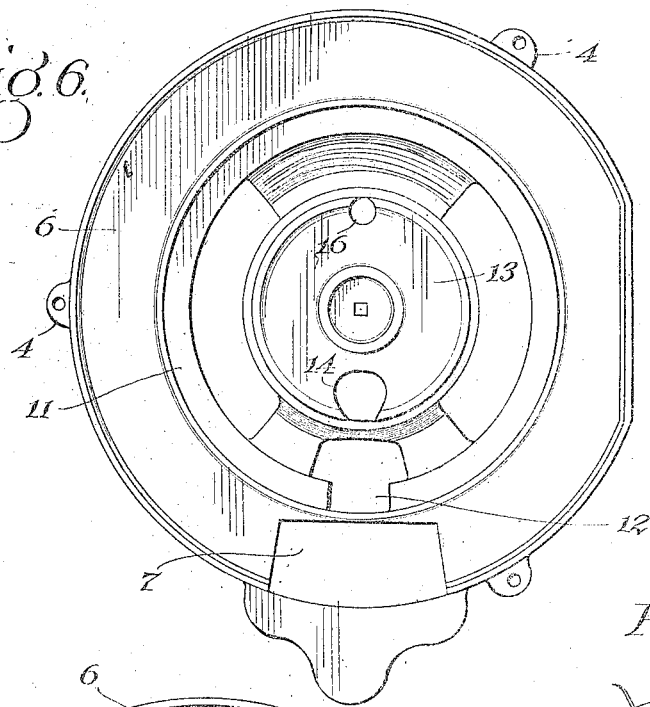
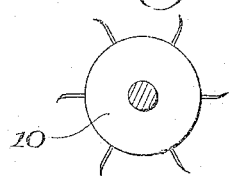
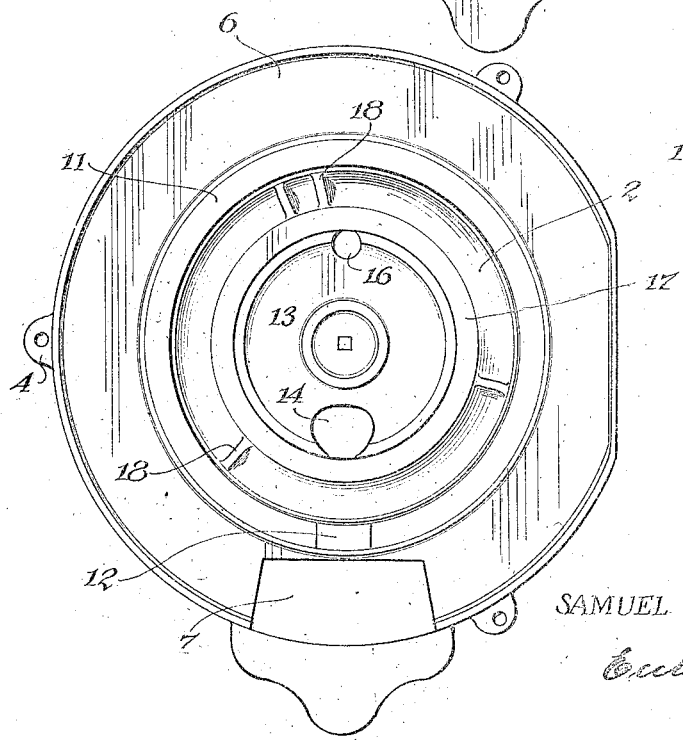
Inventor
SAMUEL OTHO HOLLAND.
Eccleston & Eccleston
Attorneys.

Patented Dec. 9, 1924.

1,518,327

UNITED STATES PATENT OFFICE.

SAMUEL OTHO HOLLAND, OF SALISBURY, NORTH CAROLINA.

SEED MECHANISM FOR PLANTERS.

Application filed December 8, 1922. Serial No. 605,631.

*To all whom it may concern:*

Be it known that I, SAMUEL OTHO HOLLAND, a citizen of the United States, and a resident of Salisbury, in the county of Rowan and State of North Carolina, have invented certain new and useful Improvements in Seed Mechanism for Planters, of which the following is a full, clear, and exact description.

My invention relates to seed mechanism for planters, and one of the objects of the invenion is to provide a mechanism of this character which is particularly adapted for the simultaneous planting of two different kinds of seeds, such as corn and beans.

A further object of the invention is to provide a mechanism of this character which is so constructed that it may be readily changed from a duplex hopper containing two kinds of seeds to a single hopper for planting only one kind of seed.

Another object of the invention is to provide a mechanism of this character which permits either the edge drop or flat drop, as may be desired.

A further object of the invention is to provide a device of this character which is not only adapted to simultaneously planting two different kinds of seed, such as corn and beans, but also may be readily changed to a cotton seed planter.

Other and further objects and advantages of the invention will be apparent from the following detailed description when taken in connection with the accompanying drawing, in which:

Figure 1 is a vertical sectional view of the apparatus, with the scrapers and knockers omitted.

Figure 2 is a plan view of the apparatus.

Figure 3 is a developed sectional view taken on line 3—3 of Figure 2.

Figure 4 is a plan view of the apparatus with the cover plate removed and clearly showing the construction of the dropping plate.

Figure 5 is a bottom plan view of the dropping plate, showing the lugs for engaging the gear ring.

Figure 6 is a plan view of the base plate; all other parts of the mechanism being removed.

Figure 7 is a plan view of the base plate with the gear ring mounted therein.

Figure 8 is a plan view of a modified form of the cover plate adapted for use when it is desired to blank off the inner seeder.

Figure 9 is a plan view of the apparatus as employed as a cotton seed planter, and Figure 10 is a side elevation of the seed wheel employed when the apparatus is used as a cotton seed planter.

Referring to the drawings more in detail, numeral 1 indicates generally the base plate, in which is mounted the usual gear ring 2, having teeth on the bottom thereof for engagement with the pinion 3, whereby the gear ring is driven. The pinion may be operated in any well known manner, and it is, therefore, not necessary to illustrate or describe any particular construction for mounting or driving the pinion.

A plurality of lugs 4 are cast integral with the base plate and provide a means for attaching the outer hopper 5 to the base plate. The base plate is provided with a flat annular portion 6 having a relatively large opening 7 therein, and walls 8, 8 integral with the base plate extend downwardly therefrom adjacent the sides of this opening, and are provided with bearings 9, 9 for mounting a toothed wheel 10 commonly used in cotton seed planters. When the apparatus is not being used as a cotton seed planter the opening 7 will be blanked off in a manner to be described. Inwardly of the flat annular portion 6 is an annular ledge 11, and this ledge is provided with an opening 12, through which the seed in the outer hopper are dropped in a manner to be described hereinafter. Inwardly of the annular ledge, and spaced therefrom by a relatively deep channel in which is mounted the gear ring, is the central portion of the base member, which portion is indicated by numeral 13. This central portion of the base plate is provided with an opening 14 for the passage of seed from the inner hopper 15. The central portion is also provided with another aperture 16 for a purpose hereinafter described.

The gear ring 2 has an annular flange 17 which rests on an annular shoulder extending around the edge of the central portion of the base plate; the teeth of the gear ring projecting downwardly into the relatively deep channel, where they are engaged by the teeth of the pinion 3. The upper side of the gear ring is provided with a plurality of upwardly extending lugs 18.

Arranged over the top of the central portion of the base plate, and resting on the annular flange 17 of the gear ring, is a cap plate 19. This cap plate is provided on its lower side with a downwardly extending finger 20 for engaging in the aperture 16 of the base plate, whereby the cap plate is maintained in fixed position. The cap plate is also provided with an opening 21 aligning with the opening 14 of the base plate for the passage of seed.

The dropping plate consists of a flat annular flange 22 to be received in the annular ledge 11 of the base plate, an inclined wall 23, and a flat central portion 24 having a large centrally arranged opening permitting the dropping plate to be fitted over the central upstanding portion of the cap plate.

The central flat portion of the dropping plate is provided with a plurality of openings 25 which align with the passage in the cap plate and base plate as the dropping plate rotates, thereby permitting the seed in the inner hopper to fall into the chute 25', shown in outline in Figure 1.

The flat annular flange 22 of the dropping plate is provided with a plurality of cut-out portions 26 at the periphery thereof, and these cut-out portions align with the passage 12 in the base plate as the dropping plate revolves, thereby permitting the seed in the outer hopper to drop into the chute.

The under side of the dropping plate is provided with downwardly extending lugs 27 which are engaged by the upwardly extending lugs 18 of the gear ring, whereby the dropping plate is caused to rotate with the gear ring.

It may be mentioned here that I may have any desired number of seed holes in the dropping plate for both the inner and outer hoppers. Also the relative arrangement of the inner and outer holes may be varied to suit varying conditions. For example, in Figure 2 the dropping plate has six seed holes for the inner hopper, and three for the outer hopper, and they are relatively arranged so that there will be two seeds dropped from the inner hopper, then one from the outer hopper, then two from the inner hopper, etc. In Figure 4 there are three seed holes for both the inner and outer hoppers, and they are alternately arranged so that the different seeds will be planted in alternate hills; while in Figure 5 three seed holes for both the inner and outer hoppers are provided, but they are aligned so that two kinds of seed will be dropped in the same hill.

A cover plate, indicated generally by numeral 28, fits over the dropping plate; the cover plate being supported out of contact with the dropping plate by means of downwardly curved fingers 28' and downwardly extending flange 29, all of which rest on the flat annular portion 6 of the base plate. The cover plate does not extend over the flat annular flange 22 of the dropping plate, which has the cut-out portion 26 for dropping the seed from the outer hopper, and hence the seed in the outer hopper will rest directly on the dropping plate. In order for the seed of the inner hopper to reach the dropping plate, I provide a substantially circular slot 30 in the cover plate, and the central portion 31 of the cover plate is reenforced by a bridge member 32 extending therefrom to the outer wall of the slot.

The bottom of the cover plate is provided with a recess (not shown), and when the cover plate is mounted in place the recess is engaged by a lug 33 on the top of the base plate, whereby the cover plate is held against rotation. A shoulder 34 extends around the periphery of the cover plate and is adapted to receive the lower end of the inner hopper, and upstanding lugs 35 on the cover plate fit against the inside of the hopper wall and hold the hopper firmly in place. Extending laterally from the cover plate is a guard member 36 which extends over the opening 7 in the base plate, and which is arched to cover the toothed wheel 10.

Spring-pressed scrapers and knockers are employed for both the inner and outer hoppers. The scrapers and knockers are of any ordinary construction and per se they form no part of the present invention. One arrangement of the knockers and scrapers is shown in Figure 3. Numeral 37 refers to a scraper which is pivotally mounted and is normally held in engagement with the dropping plate by means of the coil spring 38, which is mounted on an upstanding finger 39. A knocker is indicated by numeral 40, and it is normally held in contact with the dropping plate by means of the coil spring 41 mounted on the upstanding finger 42. For the sake of clearness the scrapers and knockers have been omitted from Figure 2. The position they will occupy is shown in Figure 2, however, by the bearings 43 in which the knockers and scrapers will be pivotally mounted; and numerals 39 and 42 indicate the pins on which the coil springs are mounted.

The operation of the apparatus thus far described is as follows:

Suppose that it is desired to simultaneously plant two kinds of seeds, for example, corn and beans. Corn will be placed in the outer hopper 5 and beans in the inner hopper 15. Then when the pinion 3 is rotated in the usual manner it will cause the gear 2 to revolve, and by means of cooperating lugs 18 and 27 the dropping plate will also be caused to revolve. The seeds in the outer hopper will rest on the annular flange 22 of the dropping plate and on the flat annular portion 6 of the base plate. As the dropping plate revolves the scraper will position the seed in the cut-out portions 26, and as these cut-out portions come into alignment with the opening 12 in the base plate the knocker will enter the cut-out portion and positively dislodge the seed therefrom and cause it to drop into the chute 25'.

In the same manner the seeds in the inner hopper 15 will rest partly on the cover plate, and, passing through the slot 30 therein, will rest partly on the dropping plate. As the dropping plate rotates the scraper will position the seed in the holes 25, and as these holes come into alignment with the holes 21 and 14 in the cap plate and base plate, respectively, the knocker will enter the hole 25 and positively dislodge the seed therefrom, causing it to drop through the holes 21 and 14 and into the chute 25''.

As previously indicated, the relative arrangement of the inner and outer holes in the dropping plate may be varied to accomplish the results desired. For example, the inner and outer holes may be arranged so that seeds from the inner and outer hoppers will be dropped simultaneously; or they may be arranged so that they will be dropped alternately; or they may be arranged so that there will be alternately two planting actions from one of the hoppers and one planting action from the other hopper, etc.

At times the operator will desire to plant only one kind of seed, and I will now describe the construction by which this device may be quickly and easily changed into an apparatus for single planting. This may be accomplished in two ways. In Figure 8 I have shown a cover plate which is practically the same in construction as the cover plate hereinbefore described, with the principal exception that the slot 30 is omitted therefrom. Also the shoulder 34 and upstanding fingers 35 are omitted, for the inner hopper is not to be used in this construction. Now, suppose it is desired to shift from the duplex planting mechanism to the single planting mechanism. All that is necessary to accomplish this is to remove the inner hopper and then remove the cover plate shown in Figures 1 and 2, and substitute therefor the cover plate 44 shown in Figure 8. As the slot 30 is omitted from the cover plate 44 it is apparent that seeds cannot reach the inner series of holes 25 in the dropping plate, and hence the seed will be dropped only through the outer series of openings 26.

Another means by which I accomplish the same result is as follows:

The cover plate shown in Figures 1 and 2 will be used in this arrangement, but a dropping plate differing slightly from the one previously described will be substituted therefor. In place of the dropping plate previously described I will employ a dropping plate with the inner series of holes omitted. In this construction, to change from a duplex planting mechanism to a single planting mechanism, the inner hopper, the cover plate, and the dropping plate, shown in Figure 1, are removed and a dropping plate with the inner series of holes omitted is inserted in the apparatus. The cover plate shown in Figure 1 is then mounted in place and the apparatus is ready for single planting. As the dropping plate is the same in construction as the one illustrated particularly in Figures 4 and 5, except that the holes 25 have been omitted therefrom, further illustration is not deemed necessary.

The planting mechanism described herein may also be used as a cotton planter by making slight modifications in the construction hereinbefore described.

The apparatus as adapted for use in cotton planting is particularly illustrated in Figure 9. The inner hopper, cover plate, and dropping plate, illustrated in Figure 1, are removed, and in their place I substitute a disc 45 similar in construction to the dropping plate, except that the holes 25 and cut-out portions 26 are omitted. Arranged around the periphery of the disc 45 is a series of teeth or pins 46 for engaging the seeds and carrying them to the wheel 10, whereby they are dislodged and dropped into a suitable chute.

From the foregoing description it is apparent that I have devised a seed mechanism for planters which, though simple in construction, is most efficient in operation.

The mechanism may be readily changed from a duplex planting mechanism to a single planting mechanism, and vice versa; and also by slight modifications it may be used for planting cotton.

It will also be apparent from the foregoing description that the mechanism which I have devised permits either the edge drop or the flat drop, as the operator may prefer.

In accordance with the patent statutes, I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

Having fully described my invention, what I claim as new and desire to secure by Letters Patent, is:

1. In a planter, a base plate provided with an annular ledge, a dropping plate, said dropping plate having a flat annular flange an inclined wall and a flat central portion, the annular ledge having a cut-out portion, the periphery of the annular flange having a plurality of cut-out portions adapted to register with the cut-out portion of the annular ledge, the base plate having an opening therein, and the flat central portion of the dropping plate having a series of holes therein adapted to register with the opening in the base plate, and means for rotating the dropping plate.

2. In a planter, a base plate having an opening therein, a gear ring mounted on the base plate, a cap mounted over the gear ring and engaging the base plate whereby it is held stationary, said cap having an opening aligned with the opening in the base plate, a dropping plate mounted over the gear ring and cap, said dropping plate being operatively connected with the gear ring and provided with a series of openings adapted to register with the opening in the cap and base plate, a cover plate mounted over the dropping plate and having a slot permitting the passage of seed to the dropping plate, and a hopper mounted on the cover plate.

3. In a planter, a base plate having an annular ledge, a relatively deep channel and a flat central portion, said annular ledge and flat central portion each provided with an opening, a gear ring mounted in the channel, a cap mounted over the gear ring and engaging the flat central portion of the base plate whereby it is held stationary, said cap having an opening therein aligned with the opening in the central portion of the base plate, a dropping plate mounted over the cap plate and having a series of openings in the periphery thereof adapted to register with the opening in the annular ledge of the base plate, an outer hopper mounted on the base plate and associated with the peripheral openings in the dropping plate, said dropping plate having an inner series of openings adapted to register with the aligned openings in the cap and central portion of the base plate, a cover plate mounted over the dropping plate and having a slot therein to permit seed to reach the inner series of openings in the dropping plate, and a hopper mounted on the cover plate and associated with the inner series of openings in the dropping plate.

4. In a planter, a base plate, a dropping plate having an inner and an outer series of openings, two concentrically arranged hoppers, one associated with the outer series of openings, and the other associated with the inner series of openings, said base plate having a relatively large opening therein, and a toothed wheel adapted to be mounted in said opening.

5. In a planter, a base plate, a dropping plate having an inner and an outer series of openings, two concentrically arranged hoppers, one associated with the outer series of openings, and the other associated with the inner series of openings, said base plate having a relatively large opening therein, a toothed wheel adapted to be mounted in said opening, a cover plate mounted over the dropping plate, and a guard member carried by the cover plate and extending over said relatively large opening.

SAMUEL OTHO HOLLAND.